(12) United States Patent
Kim et al.

(10) Patent No.: US 12,013,150 B2
(45) Date of Patent: Jun. 18, 2024

(54) AIR HUMIDIFICATION AND PURIFICATION DEVICE

(71) Applicant: COWAY CO., LTD., Chungcheongnam-do (KR)

(72) Inventors: Do-Yeop Kim, Seoul (KR); An-Ho Cho, Seoul (KR); Hyun-Jin Hong, Seoul (KR)

(73) Assignee: COWAY CO., LTD., Chungcheongnam-Do (KR)

( * ) Notice: Subject to any disclaimer, the term of this patent is extended or adjusted under 35 U.S.C. 154(b) by 56 days.

(21) Appl. No.: 17/618,719

(22) PCT Filed: Jun. 12, 2020

(86) PCT No.: PCT/KR2020/007657
§ 371 (c)(1),
(2) Date: Dec. 13, 2021

(87) PCT Pub. No.: WO2020/256354
PCT Pub. Date: Dec. 24, 2020

(65) Prior Publication Data
US 2022/0243934 A1 Aug. 4, 2022

(30) Foreign Application Priority Data
Jun. 17, 2019 (KR) .......................... 10-2019-0071805

(51) Int. Cl.
*F24F 6/04* (2006.01)
*B01D 46/00* (2022.01)
(Continued)

(52) U.S. Cl.
CPC ............ *F24F 6/04* (2013.01); *B01D 46/0049* (2013.01); *B01D 46/44* (2013.01); *F24F 8/108* (2021.01);
(Continued)

(58) Field of Classification Search
CPC .......... F24F 6/04; F24F 8/108; F24F 11/0008; F24F 13/14; F24F 2006/008; F24F 8/80;
(Continued)

(56) References Cited

U.S. PATENT DOCUMENTS 3,361,415 A * 1/1968 Lane ...................... G05D 22/02
210/138
5,368,784 A * 11/1994 Annestedt, Sr. ...... B01F 23/215
261/106
(Continued)

FOREIGN PATENT DOCUMENTS

CN 206310047 U * 7/2017 ............. F16K 31/18
CN 104603547 B * 11/2017 ............. F24F 13/24
(Continued)

OTHER PUBLICATIONS

International Search Report for corresponding International Application No. PCT/KR2020/007657, dated Aug. 7, 2020, 11 pages.
(Continued)

*Primary Examiner* — Stephen Hobson
(74) *Attorney, Agent, or Firm* — GUNTIN & GUST, PLC; Miyoung Shin

(57) ABSTRACT

Provided is an air humidification and purification device comprising: a housing; a blowing part; an air purification filter; a water container; a water tank unit; a humidification member; an air flow path part; a flow path regulating member; and a driving part, wherein the water container has a water supply valve member, the flow path regulating member includes: a rotary shaft part; a body part rotating integrally with the rotary shaft part, and opening and closing at least a portion of the air flow path part; and a pressing part which rotates integrally with the rotary shaft part, and when the flow path regulating member rotates, the flow direction of the air in the air flow path part is changed by means of the
(Continued)

body part, and the water supply valve member opens and closes by means of the pressing part.

19 Claims, 11 Drawing Sheets

(51) Int. Cl.
    *B01D 46/44*     (2006.01)
    *F24F 8/108*     (2021.01)
    *F24F 11/00*     (2018.01)
    *F24F 13/14*     (2006.01)
    *F24F 6/00*     (2006.01)

(52) U.S. Cl.
    CPC .......... *F24F 11/0008* (2013.01); *F24F 13/14* (2013.01); *B01D 2273/30* (2013.01); *F24F 2006/008* (2013.01)

(58) Field of Classification Search
    CPC .. F24F 11/65; F24F 13/20; F24F 13/10; F24F 6/043; F24F 2013/205; F24F 8/10; B01D 46/0049; B01D 46/44; B01D 2273/30
    See application file for complete search history.

(56) References Cited

U.S. PATENT DOCUMENTS

| | | | | |
|---|---|---|---|---|
| 5,857,350 | A * | 1/1999 | Johnson | F28D 5/00 261/106 |
| 6,053,482 | A * | 4/2000 | Glenn | F24F 6/043 261/DIG. 46 |
| 6,427,984 | B1 * | 8/2002 | Mulvaney | F24F 6/043 261/107 |
| 6,945,519 | B2 * | 9/2005 | Parker | F24F 6/043 261/99 |
| 10,168,064 | B1 * | 1/2019 | Zhang | F24F 6/12 |
| 10,900,677 | B2 * | 1/2021 | Chen | F24F 6/06 |
| 11,333,377 | B2 * | 5/2022 | Yang | F24F 13/06 |
| 2003/0164559 | A1 * | 9/2003 | Rhea | F24F 6/00 261/66 |
| 2005/0067723 | A1 * | 3/2005 | Parker | F24F 6/043 261/104 |
| 2008/0093750 | A1 * | 4/2008 | Wang | F24F 6/00 261/66 |
| 2008/0127820 | A1 * | 6/2008 | Park | A61L 9/122 55/438 |
| 2009/0139408 | A1 * | 6/2009 | Kang | F24F 8/108 96/366 |
| 2009/0314164 | A1 * | 12/2009 | Yamashita | F24F 6/043 96/245 |
| 2012/0164935 | A1 * | 6/2012 | Ha | F24F 6/06 454/337 |
| 2014/0083524 | A1 * | 3/2014 | Huang | F24F 6/00 137/409 |
| 2014/0145355 | A1 * | 5/2014 | Shimizu | F24F 6/06 261/30 |
| 2014/0264963 | A1 * | 9/2014 | Barker | F24F 13/00 261/37 |
| 2015/0021795 | A1 * | 1/2015 | Bae | F24F 6/00 261/119.1 |
| 2015/0330643 | A1 * | 11/2015 | Lee | F24F 6/06 210/243 |
| 2016/0146502 | A1 * | 5/2016 | Kim | F24F 3/1405 165/110 |
| 2016/0305674 | A1 * | 10/2016 | Kim | F24F 11/74 |
| 2018/0128507 | A1 * | 5/2018 | Hitzler | C02F 1/68 |
| 2019/0072289 | A1 * | 3/2019 | Lai | B01F 23/20 |
| 2019/0226696 | A1 * | 7/2019 | Kim | F24F 6/04 |
| 2019/0383503 | A1 * | 12/2019 | Kim | F24F 6/16 |
| 2020/0191417 | A1 * | 6/2020 | Chen | F24F 7/007 |
| 2021/0080147 | A1 * | 3/2021 | Kohama | F24F 13/08 |
| 2021/0088075 | A1 * | 3/2021 | Bae | F24F 1/0087 |
| 2021/0172628 | A1 * | 6/2021 | Park | B01F 23/215 |
| 2022/0082274 | A1 * | 3/2022 | Kim | F24F 6/04 |
| 2022/0243934 | A1 * | 8/2022 | Kim | B01D 46/44 |
| 2022/0381456 | A1 * | 12/2022 | Chen | F24F 6/12 |
| 2023/0093557 | A1 * | 3/2023 | Hong | F24F 11/0008 96/257 |

FOREIGN PATENT DOCUMENTS

| | | | | |
|---|---|---|---|---|
| CN | 108825803 | A * | 11/2018 | ............... F16K 1/32 |
| CN | 108825804 | A * | 11/2018 | ............... F16K 1/32 |
| CN | 108870615 | A * | 11/2018 | ............ A61L 9/122 |
| CN | 111238020 | A * | 6/2020 | ............ F16K 21/18 |
| CN | 211876216 | U * | 11/2020 | ............ F16K 21/18 |
| CN | 215765632 | U * | 2/2022 | |
| EP | 2072921 | A1 | 6/2009 | |
| EP | 3081872 | A1 * | 10/2016 | ............ F16K 21/18 |
| EP | 3913291 | A4 * | 11/2021 | ............... F24F 6/04 |
| JP | H 1-139489 | U | 8/1991 | |
| JP | 2003302077 | A | 10/2003 | |
| JP | 2009014254 | A | 1/2009 | |
| JP | 2012052699 | A | 3/2012 | |
| JP | 2012112613 | A | 6/2012 | |
| JP | 6397756 | B2 * | 9/2018 | |
| KR | 1020090024833 | A | 3/2009 | |
| KR | 1020090058446 | A | 6/2009 | |
| KR | 2011092928 | A * | 8/2011 | ............... F24F 6/12 |
| KR | 1020120101788 | A | 9/2012 | |
| KR | 1020120113026 | A | 10/2012 | |
| KR | 2017127266 | A * | 11/2017 | ............ F16K 15/14 |
| KR | 1020180073361 | A | 7/2018 | |
| KR | 101893533 | B1 | 8/2018 | |
| KR | 1020190001334 | A | 1/2019 | |
| WO | WO-2017149798 | A1 * | 9/2017 | ............... F24F 6/04 |
| WO | WO-2018113414 | A1 * | 6/2018 | ............ F16K 31/18 |
| WO | WO-2020141796 | A2 * | 7/2020 | .......... F24F 11/0008 |
| WO | WO-2021194277 | A1 * | 9/2021 | ......... B01D 46/0027 |
| WO | WO-2023034611 | A1 * | 3/2023 | .......... A61M 16/203 |

OTHER PUBLICATIONS

Extended European Search Report issued in corresponding EP Application No. 20826869.8, dated Jun. 27, 2022, 10 pages.
JP Office Action mailed Mar. 26, 2024 for Corresponding JP Application No. JP 2020-572778, 4 pgs.

* cited by examiner

[Fig. 1]
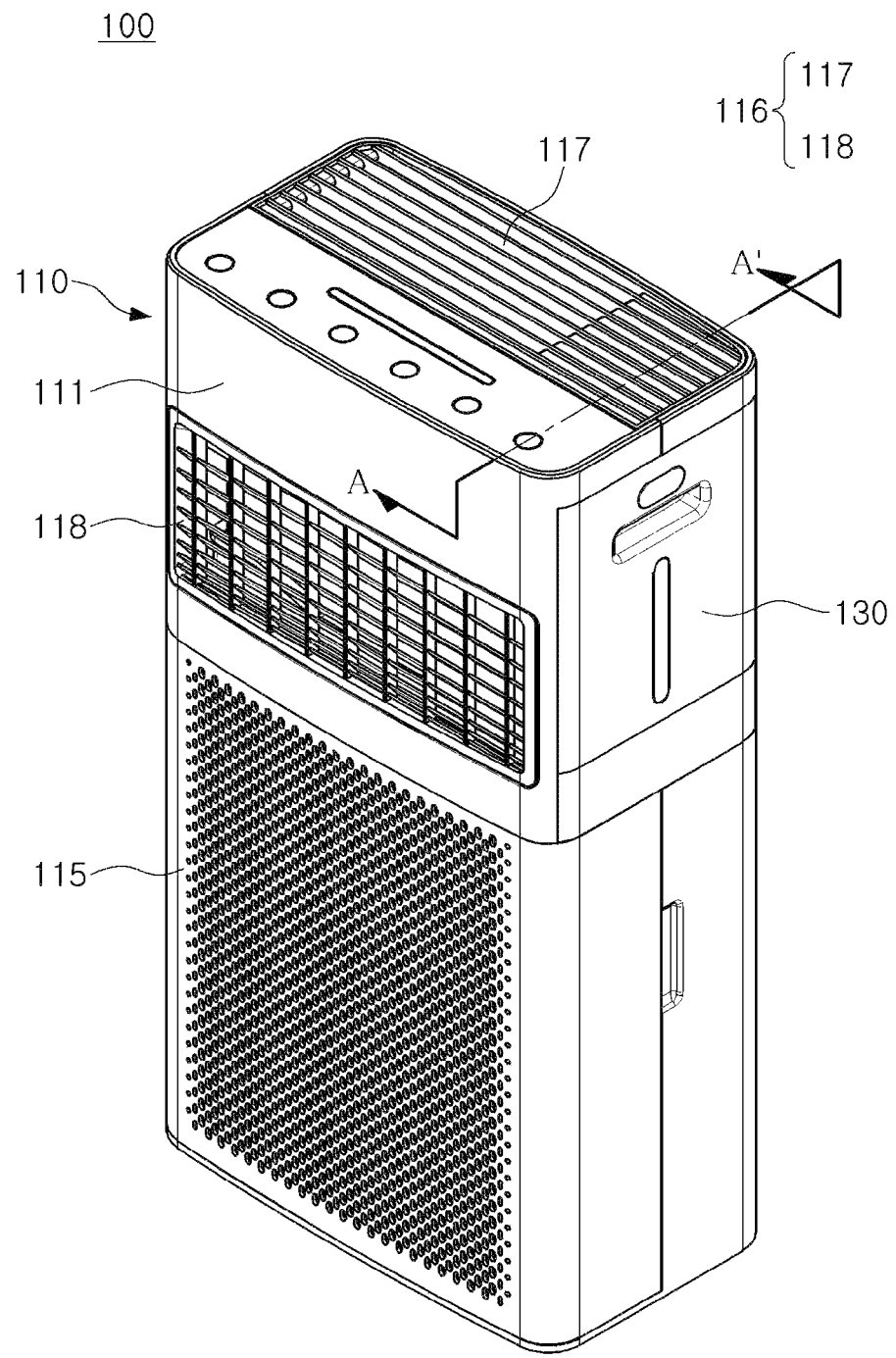

[Fig. 2]
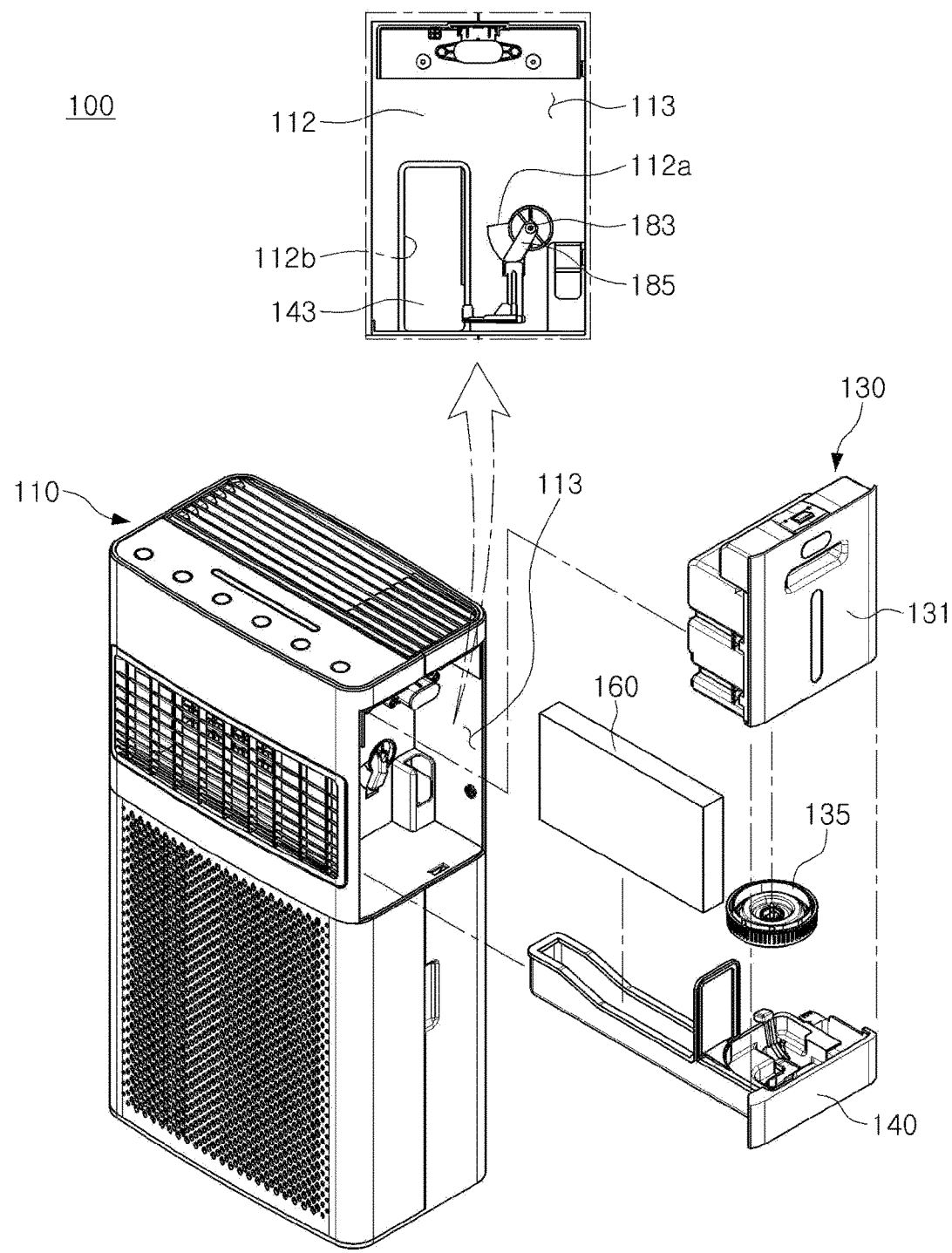

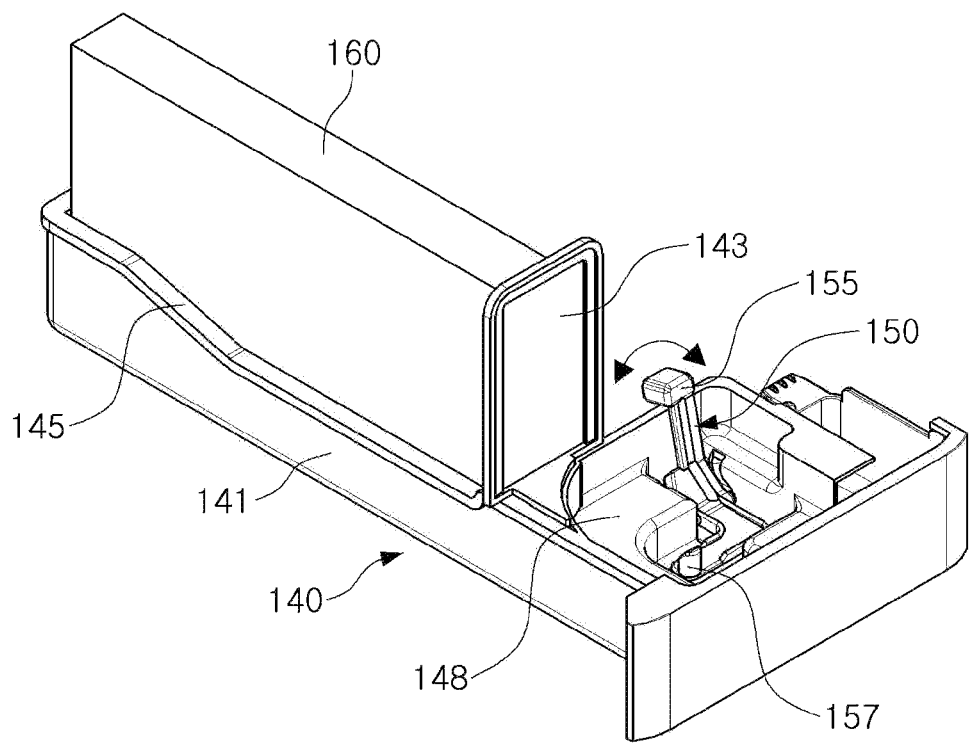
[Fig. 3]

[Fig. 4]
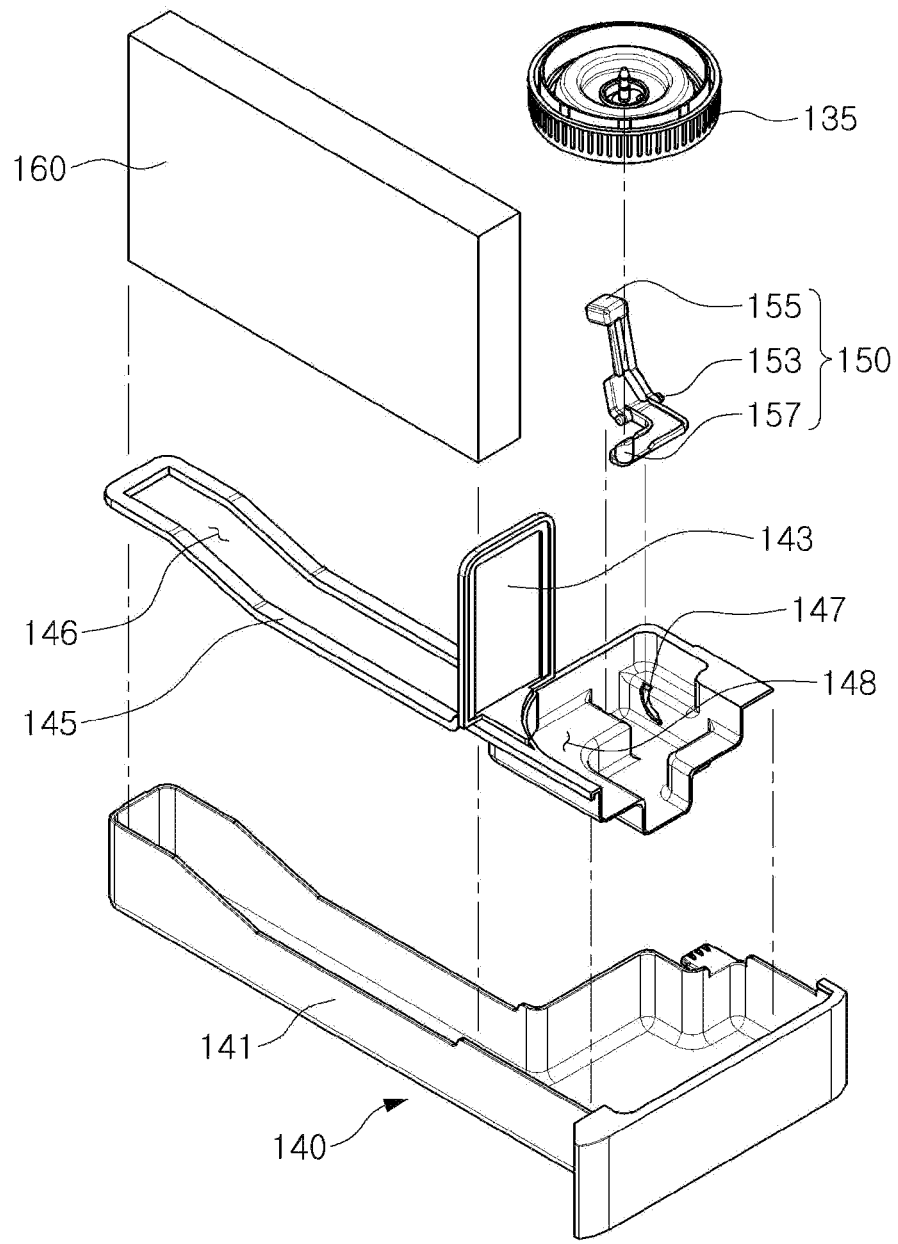

[Fig. 5]
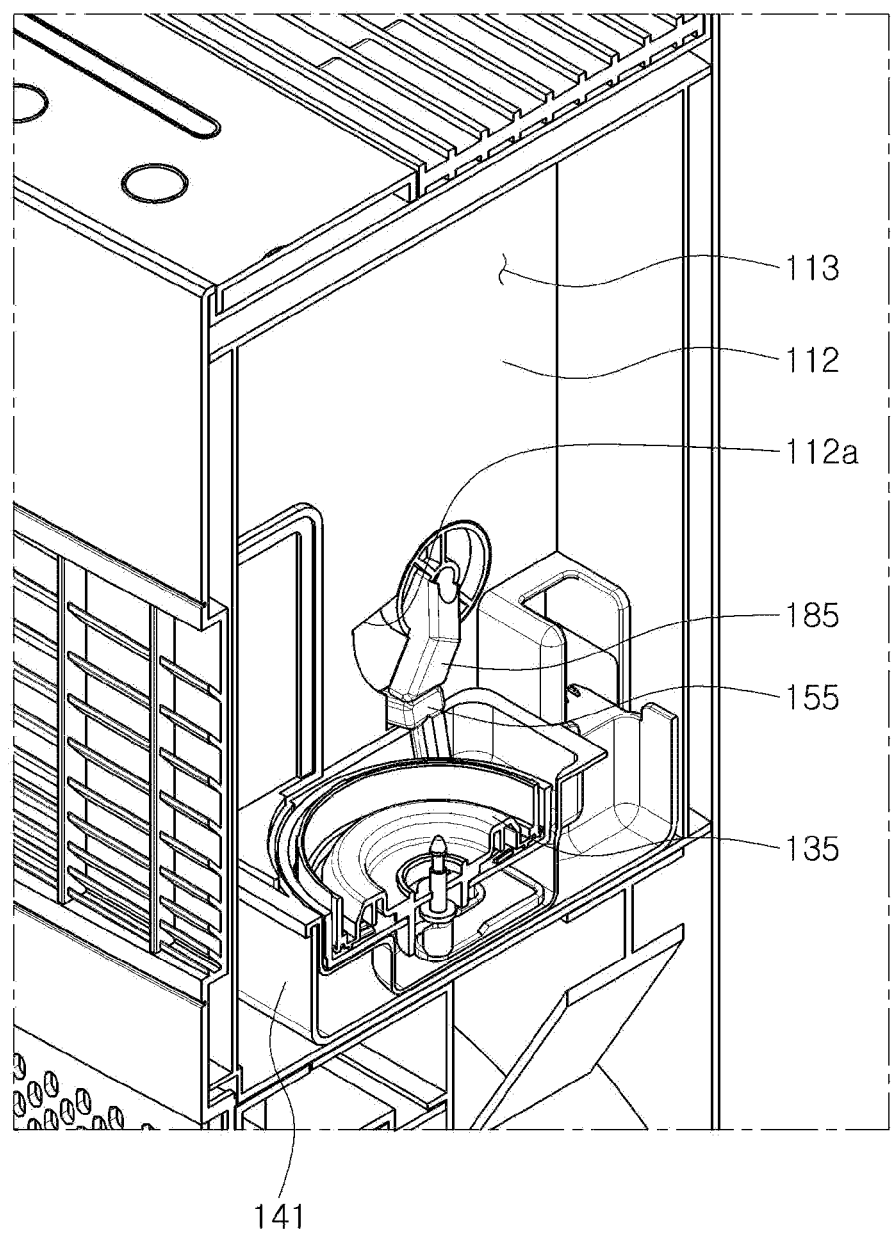

[Fig. 6]
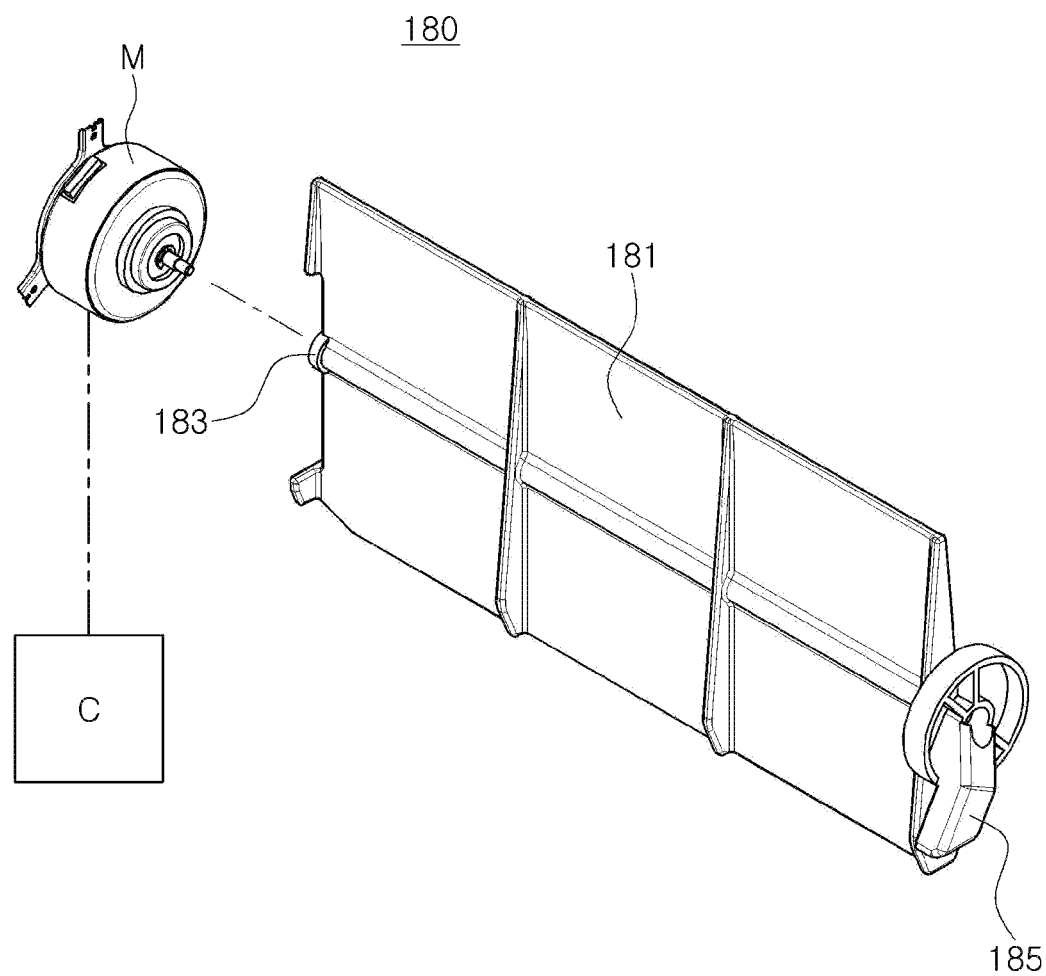

[Fig. 7]
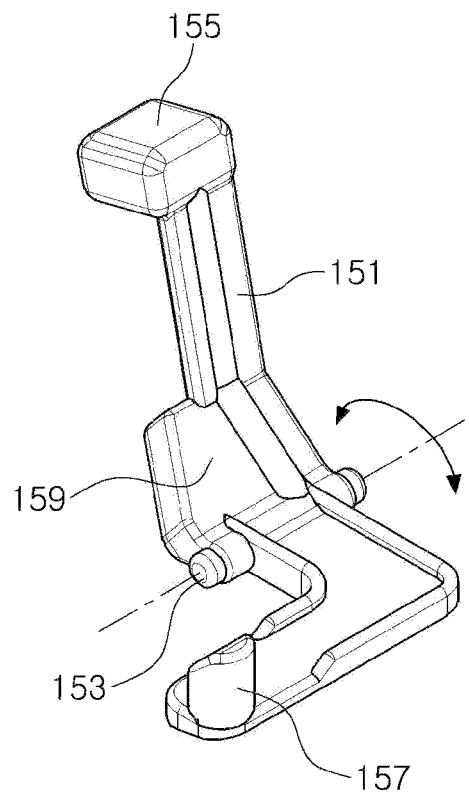

[Fig. 8]
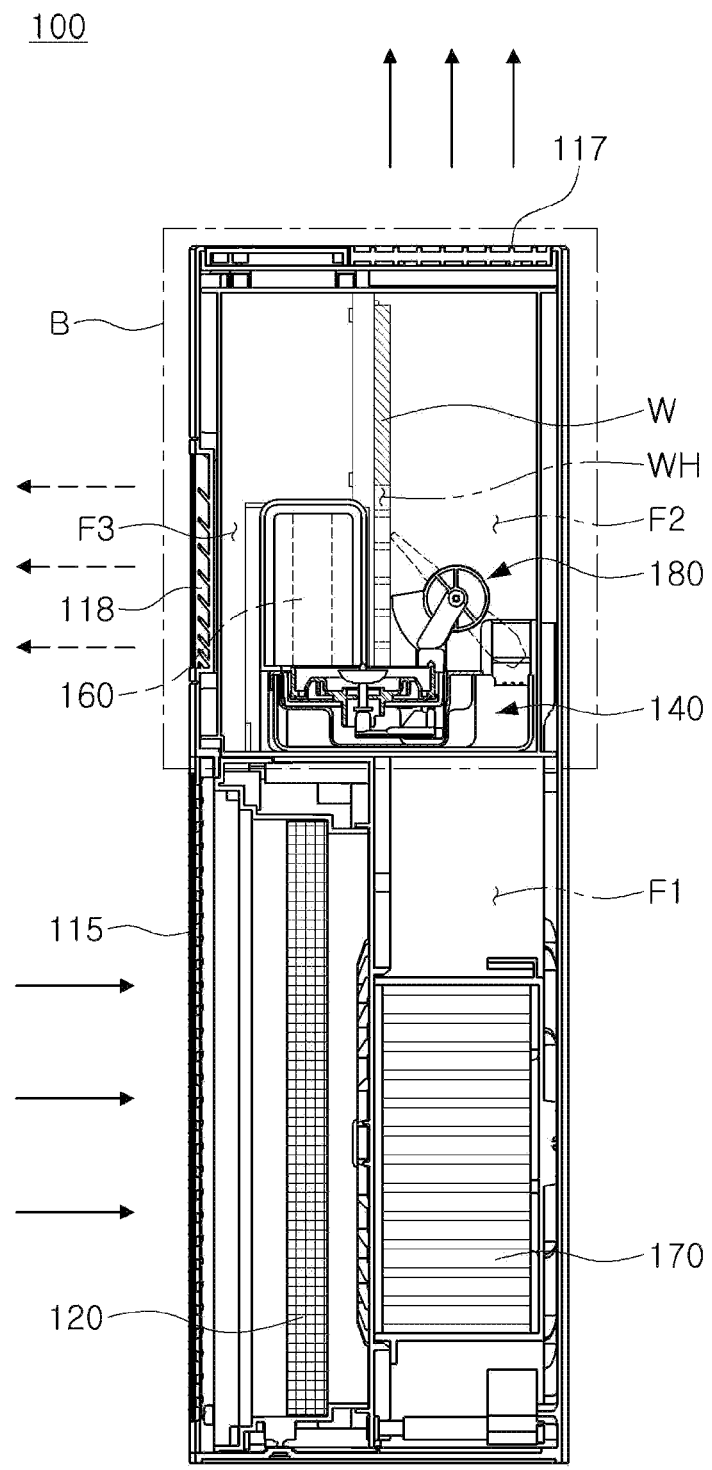

[Fig. 9]
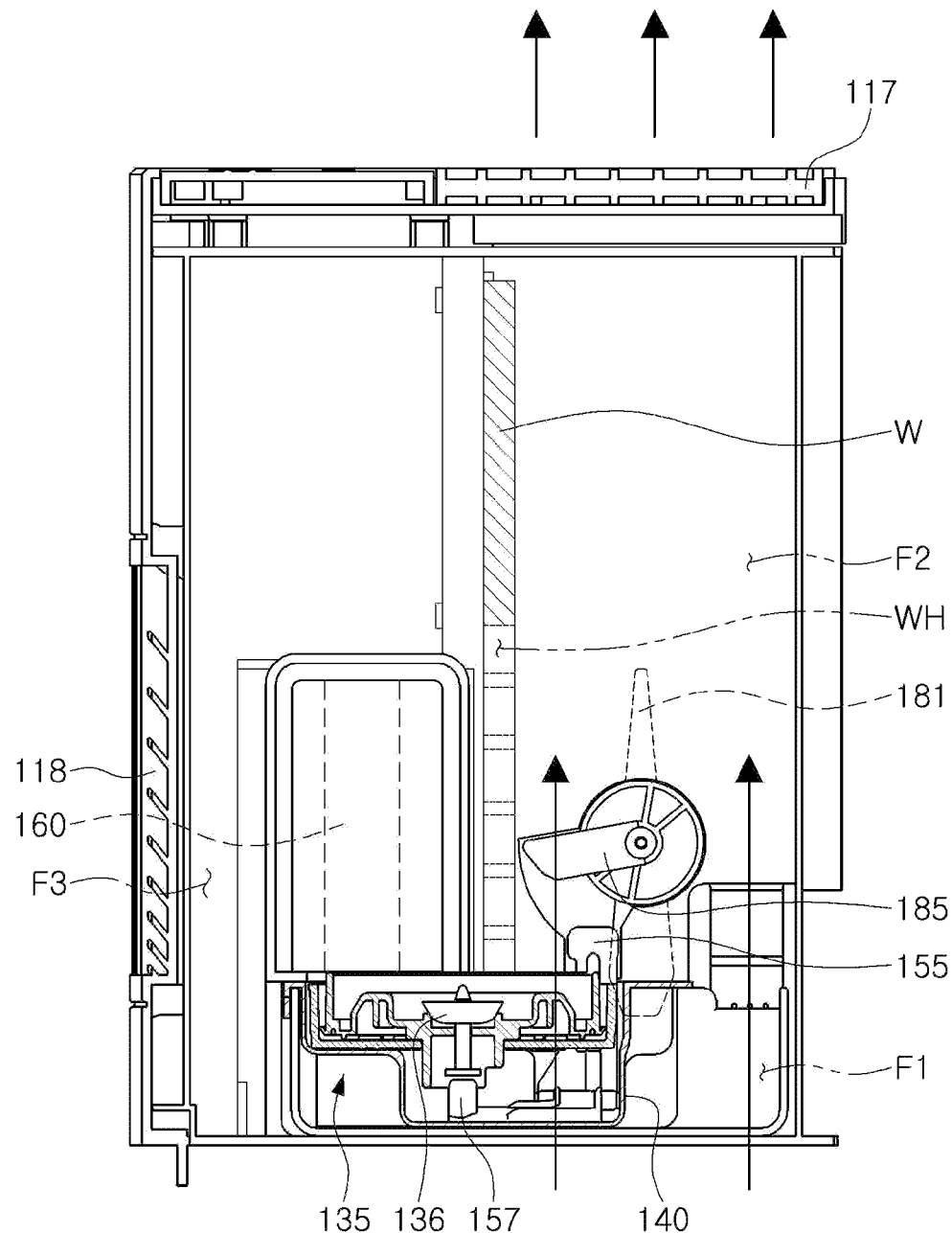

[Fig. 10]

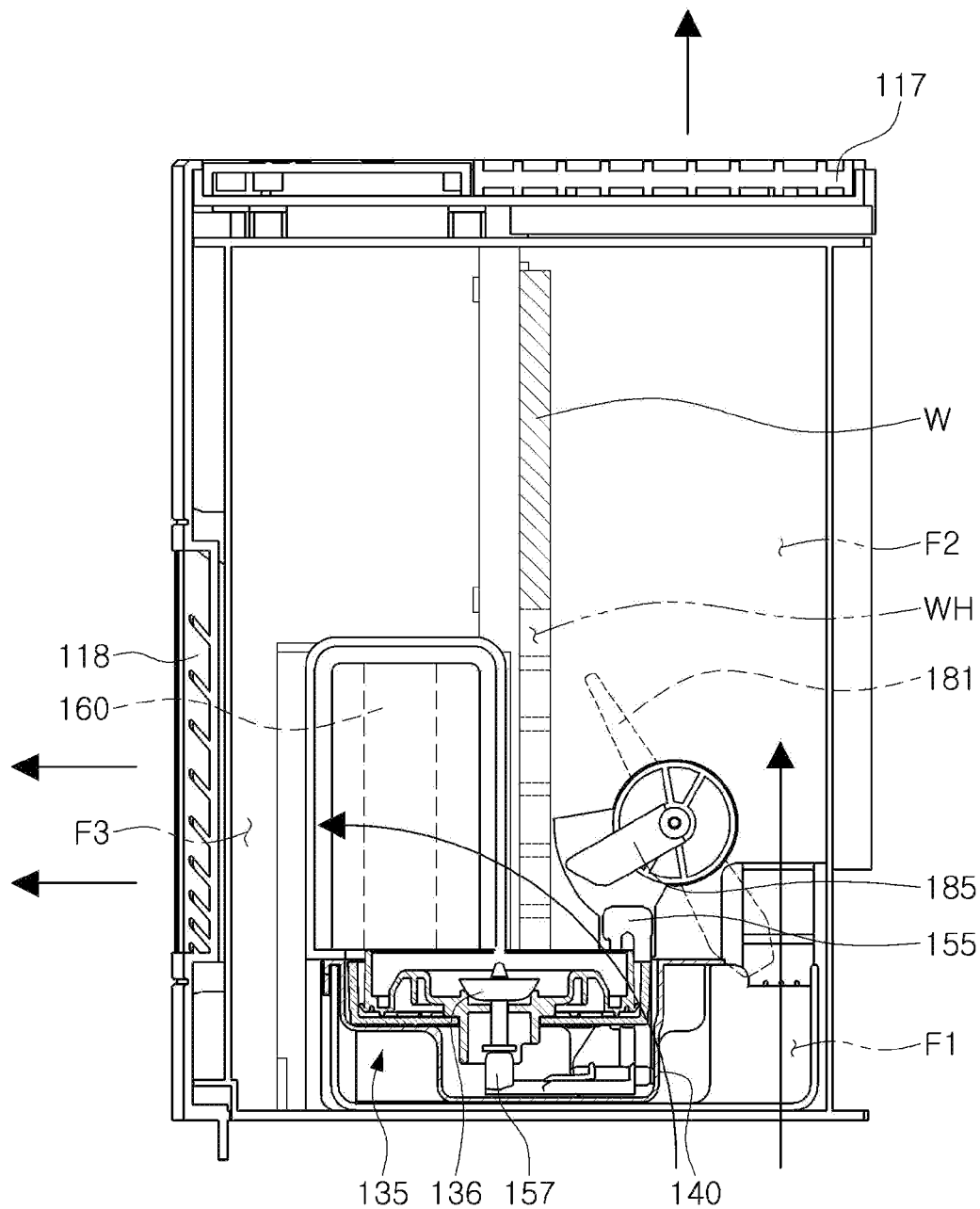
[Fig. 11]

AIR HUMIDIFICATION AND PURIFICATION DEVICE

TECHNICAL FIELD

The present disclosure relates to an air humidification and purification device having an air purification function and a humidification function, and more particularly, an air humidification and purification device which may regulate a flow path to perform an air purification function and a humidification function.

BACKGROUND ART

An air purifier is a device purifying polluted air into fresh air, and may perform a function of removing dust and germs along with odors by allowing incoming air to pass through an air purification filter.

A general air humidification and purification device may include a blowing fan (a blowing part) for suctioning air to be purified and a purification filter for purifying air.

Meanwhile, the air purifier may include a humidification member (humidification filter) to supply humidified air in addition to the air purification filter. As described above, an air humidification and purification device having a humidification function may control indoor humidity by discharging air containing moisture.

A general air humidification and purification device may use vaporization-type (blowing-type) humidification as in a method of vaporizing by blowing water absorbed by a humidification member after the humidification member is immersed in a water tank or vaporizing by blowing water on a plurality of disks by rotating the disks while a portion of the disks are immersed in a water tank.

In the case of such a general humidifying purifier, a water container may be mounted on a water tank, and water may be supplied from the water container to the water tank regardless of whether the humidification mode is performed, such that the water tank may maintain a constant water level. Accordingly, the water supply from the water container to the water tank may be stopped only when the entire water contained in the water container is emptied, and the water in the water tank may be completely removed only when the entire water contained in the water tank is evaporated.

Accordingly, in the general air humidification and purification device, since water may remain at a predetermined water level in the water tank even after humidification ends, mold, scale, scale, odor, or bacteria may proliferate in the water tank and/or the humidification member.

Meanwhile, in an air humidification and purification device, a humidification member may be installed side by side with the air purification filter on the rear end of the air purification filter, and a blowing fan for suctioning air may be installed on the rear end of the humidification member. In the case, some of the air passing through the air purification filter may flow into the blowing fan through the humidification member, but the other air may flow directly into the blowing fan without passing through the humidification member. Therefore, since the general air humidification and purification device does not have a structure in which the entirety of air passing through the air purification filter may pass through the humidification member, the humidification efficiency may be lowered when a humidifying mode is performed.

To resolve the problem, a flow path regulating member for controlling the flowing direction of air may be used to increase the flow rate of the air passing through the air purification filter is supplied to the humidification member in the humidification mode. However, even when the flow path regulating member is used, the entirety of air passing through the air purification filter is not supplied to the humidification member, such that there may be a limitation in improving the humidification efficiency.

Also, in a general air humidification and purification device, some of the air filtered through the air purification filter may be supplied to the humidification member even in a purification-only mode in which humidification is not performed, such that the air purification efficiency may degrade, which may be problematic. That is, in the purification-only mode, an unnecessary humidification member may act as a flow resistance against air passing through the air purification filter. Therefore, in a general air humidification and purification device, to achieve the same amount of air discharge as in the case in which air does not pass through a humidification member, the driving RPM of the blowing fan may need to be increased, such that power consumption and noise may increase, which may be problematic.

DISCLOSURE

Technical Problem

One aspect of the present disclosure is to provide an air humidification and purification device which may efficiently block a water supply from a water container to a water tank unit.

Also, one aspect of the present disclosure is to provide an air humidification and purification device which may significantly reduce contamination or bacterial generation in a water tank unit and/or a humidification member (a humidification filter).

Further, one aspect of the present disclosure is to provide an air humidification and purification device which may supply water to a water tank unit only in a humidification mode.

Also, one aspect of the present disclosure is to provide an air humidification and purification device which may supply water to a water tank unit according to flow path regulation without using a driving means to supply water to a water tank unit.

Also, one aspect of the present disclosure is to provide an air humidification and purification device which may easily implement a humidification mode and a purification mode.

Also, one aspect of the present disclosure is to provide an air humidification and purification device which may improve humidification efficiency and air purification efficiency.

Technical Solution

According to one aspect of the present disclosure, an air humidification and purification device includes a housing having a suction port through which air is suctioned, and a discharge port through which air is discharged; a blowing part provided in the housing, and providing blowing force to allow air flowing in from the suction port to flow to the discharge port; an air purification filter disposed in the housing and filtering air flowing in from the suction port; a water container provided in the housing; a water tank unit for receiving water from the water container; a humidification member for performing humidification using water supplied to the water tank unit; an air flow path part formed between the suction port and the discharge port, and in which air flowing from the suction port flows; a flow path regulating member rotatably disposed in the air flow path part; and a driving part for providing rotational force to the flow path regulating member, wherein the water container includes a water supply valve member opening and closing to allow water contained therein to be discharged, wherein the flow path regulating member includes a rotary shaft part formed as a center of rotation, a body part rotating integrally with the rotary shaft part, and configured to cross the air flow path part to open and close at least a portion of the air flow path part, and a pressing part rotating integrally with the rotary shaft part, and providing pressing force to open water supply valve member, and wherein, when the flow path regulating member rotates, a direction of air flow in the air flow path part changes by the body part, and the water supply valve member opens and closes by the pressing part.

The discharge port may include a humidified air discharge port through which air flowing in from the suction port is discharged through the air purification filter and the humidification member, and a purified air discharge port through which air is discharged without passing through the humidification member.

The flow path regulating member may switch a flow path such that air flowing through the air flow path part may be discharged through at least one of the humidified air discharge port and the purified air discharge port.

The flow path regulating member may have a purification mode position in which air flowing through the air flow path part is discharged through the purified air discharge port, and a humidification mode position in which air is discharged through the humidified air discharge port. The flow path regulating member may be configured to open the water supply valve member in the humidification mode position.

The flow path regulating member may further include a third position disposed between the purification mode position and the humidification mode position such that air flowing through the air flow path part may be discharged through the purified air discharge port and the humidified air discharge port.

The air humidification and purification device may further include a control part for controlling driving of the flow path regulating member and the blowing part, and the control part may move the flow path regulating member to the third position such that the humidification member may be dried after the humidification ends.

The air humidification and purification device may further include a water supply regulating member installed in the water tank unit and operating to open and close the water supply valve member, and the flow path regulating member may open the water supply valve member by pressurizing the water supply regulating member.

The water tank unit may include a water tank body for accommodating water therein, and a water tank cover for covering at least a portion of an upper portion of the water tank body, and the water supply regulating member is installed on the water tank cover.

The water supply regulating member may include a body part, a contact part formed on one side of the body part and pressed by the flow path regulating member, a pressing part formed on the other side of the body part and pressurizing the water supply valve member, and a rotary shaft part disposed between the contact part and the pressing part and coupled to an installation groove formed in the water tank cover.

The water supply regulating member may be configured to be able to perform seesaw movement with respect to the rotating shaft, and wherein, when the flow regulating member pressurizes the contact part downwardly, the pressing part may move upwardly and may open the water supply valve member.

The water supply regulating member may include a weight part for adding weight to one side of the body part such that the contact part side may be inclined downwardly with respect to the rotary shaft part in a state in which the water supply regulating member is installed in the water tank cover.

The installation groove may be configured as a groove in which the contact part side is opened and the pressing part side is closed in a state in which the water supply regulating member is installed on the water tank cover.

The housing may include an opening in which the water container is installed and a partition for dividing the air flow path part therein, and the water supply regulating member may be disposed in the opening, and the pressing part of the flow path regulating member may be exposed to the opening through a through-hole formed in the partition so as to pressurize the contact part.

The water tank unit and the humidification member may be installed to be separated from the housing by sliding while the water container is separated from the housing.

The humidification member may be disposed on a rear end of the blowing part and may be configured to humidify air discharged from the blowing part.

The suction port may be formed in a front lower portion of the housing, the humidified air discharge port is formed on a front upper portion of the housing, the purified air discharge port is formed on an upper surface of the housing, and the humidification member is installed side by side with a front surface of the housing. In this case, the flow path regulating member may be disposed in a vertical direction when air is discharged through the purified air discharge port, and an upper end thereof may be inclined toward the humidified air discharge port when air is discharged through the humidified air discharge port.

According to one aspect of the present disclosure, an air humidification and purification device includes housing having a suction port through which air is suctioned, and a discharge port through which air is discharged; an air purification filter disposed in the housing and filtering air flowing in from the suction port; a humidification member for performing humidification using water supplied to the water tank unit; a blowing part providing blowing force to allow air flowing in from the suction port to flow to the discharge port via an air flow path part formed between the suction port and the discharge port; a flow path regulating member rotatably disposed in the air flow path part, and rotating between a humidification mode position in which air flowing through the air flow path part is discharged via the humidification member, and a purification mode position in which air is discharged without passing through the humidification member, wherein the flow path regulating member is configured to open the water supply valve member provided in the water container such that water is supplied from the water container to the water tank unit in the humidification mode position.

The flow path regulating member may be disposed in a third position disposed between the purification mode position and the humidification mode position, and the water supply valve member may have a closed state in the purification mode position and the third mode position.

Advantageous Effects

According to an embodiment of the present disclosure, since the opening and closing of a water supply valve member provided in a water container is performed by rotation of the flow path regulating member, an effect of effectively blocking water supply from a water container to a water tank unit may be obtained.

Also, according to an embodiment of the present disclosure, water may be supplied to the water tank unit only when a flow path regulating member is in a humidification mode position, and water supply to the water tank unit may be blocked in a drying mode position, such that an effect that moisture present in the water tank unit and/or the humidification member may be removed by the drying mode performed when the humidification mode ends and that contamination or bacterial generation in the water tank unit and/or the humidification member may thus be significantly reduced may be obtained.

Further, according to an embodiment of the present disclosure, an effect that a driving means for supplying water to the water tank unit may not be necessary as water supply to the water tank unit and blocking of the water supply may be possible only by rotation of the flow path regulating member rotating between the purification mode position and the humidification mode position may be obtained.

Also, according to an embodiment of the present disclosure, an effect that the water tank unit may be stably installed by avoiding the interference between the water supply regulating member and the flow path regulating member when the water tank unit is installed in a housing may be obtained.

Also, according to an embodiment of the present disclosure, an effect that the humidification mode and the purification mode may be easily implemented by a simple manipulation of rotating the flow path regulating member may be obtained.

Also, according to an embodiment of the present disclosure, the air purification filter may be disposed on the front end of the blowing part and the humidification member may be disposed on the rear end of the blowing part, such that, when the purification mode is performed, the flow of air filtered by the air purification filter to the humidification member may be limited, which may increase air purifying efficiency, and accordingly, even when the blowing fan provided in the blowing part is driven at a relatively low RPM and low power, the sufficient amount of discharge may be secured and noise be reduced. Further, an effect that, by allowing the discharged air to flow toward the humidification member when the humidification mode is performed, humidification efficiency may increase may be obtained.

BRIEF DESCRIPTION OF DRAWINGS

FIG. 1 is a perspective diagram illustrating an air humidification and purification device according to an embodiment of the present disclosure;

FIG. 2 is a perspective diagram illustrating a state in which a water container is separated from a water tank unit in the air humidification and purification device illustrated in FIG. 1;

FIG. 3 is a perspective diagram illustrating the water tank unit and the humidification member illustrated in FIG. 2;

FIG. 4 is an exploded perspective diagram illustrating the water tank unit and the humidification member illustrated in FIG. 3;

FIG. 5 is a cross-sectional diagram illustrating the air humidification and purification device illustrated in FIG. 1 from which a water container body is removed, taken along line A-A' in FIG. 1;

FIG. 6 is a perspective diagram illustrating a flow path regulating member provided in an air humidification and purification device according to an embodiment of the present disclosure;

FIG. 7 is a perspective diagram illustrating a water supply regulating member illustrated in FIG. 4;

FIG. 8 is diagrams illustrating the air humidification and purification device illustrated in FIG. 1, where the lower portion is a longitudinal cross-sectional diagram illustrating a central portion, and the upper portion is a longitudinal cross-sectional diagram in a state in which a water container is removed, taken along line A-A' in FIG. 1;

FIG. 9 is an enlarged diagram illustrating a state in a purification mode with respect to portion B in FIG. 8;

FIG. 10 is an enlarged diagram illustrating a state in a humidification mode with respect to portion B in FIG. 8; and FIG. 11 is an enlarged diagram illustrating a state in a drying mode with respect to portion B in FIG. 8.

BEST MODE FOR INVENTION

Hereinafter, preferable embodiments of the present disclosure will be described with reference to the accompanying drawings. However, the embodiments of the present disclosure may be modified in various other forms, and the scope of the present disclosure is not limited to the embodiments described below. Also, the embodiments of the present disclosure are provided to describe the present disclosure more completely to a person having ordinary skill in the art. The shapes and sizes of the elements in the drawings may be exaggerated for clearer description.

Also, in the present specification, a singular term may include a plural form unless otherwise indicated, and the same reference numerals refer to the same element or a corresponding element throughout the embodiments.

In the description below, the embodiments of the present disclosure will be described with reference to the drawings.

First, an air humidification and purification device 100 will be described with reference to FIGS. 1 to 8 according to an embodiment of the present disclosure.

FIG. 1 is a perspective diagram illustrating an air humidification and purification device 100 according to an embodiment of the present disclosure. FIG. 2 is a perspective diagram illustrating a state in which a water container 130 is separated from a water tank unit 140 in the air humidification and purification device 100 illustrated in FIG. 1. FIG. 3 is a perspective diagram illustrating the water tank unit 140 and the humidification member 160 illustrated in FIG. 2. FIG. 4 is an exploded perspective diagram illustrating the water tank unit 135 and the humidification member 135 illustrated in FIG. 3. FIG. 4 further illustrates the water tank unit 135 for ease of description. FIG. 5 is a cross-sectional diagram illustrating the air humidification and purification device 100 illustrated in FIG. 1 from which a water container body 131 is removed, taken along line A-A' in FIG. 1. FIG. 6 is a perspective diagram illustrating a flow path regulating member 180 provided in an air humidification and purification device 100 according to an embodiment of the present disclosure. FIG. 7 is a perspective diagram illustrating a water supply regulating member 150 illustrated in FIG. 4. FIG. 8 is diagrams illustrating the air humidification and purification device 100 illustrated in FIG. 1, where the lower portion is a longitudinal cross-sectional diagram illustrating a central portion, and the upper portion is a longitudinal cross-sectional diagram illustrating in a state in which a water container 130 is removed, taken along line A-A' in FIG. 1.

As illustrated in FIGS. 1 to 8, the air humidification and purification device 100 according to an embodiment of the present disclosure may include a housing 110 forming the exterior of the product, an air purification filter 120 for filtering and purifying air, a water container 130 accommodating water for humidification and having a water supply valve member 135, a water tank unit 140 receiving water from the water container 130, a humidification member 160 performing humidification, a blowing part 170 providing blowing power, air flow path part F1, F2, and F3 formed between the suction port 115 and the discharge port 116, a flow path regulating member 180 for regulating the air flow, and a driving part M for providing a rotational force. Also, the air humidification and purification device 100 according to an embodiment of the present disclosure may include a control part C for controlling the driving of the air humidification and purification device 100 and a water supply regulating member 150 operating to open and close the water supply valve member 135.

First, as illustrated in FIGS. 1 and 2, the air humidification and purification device 100 according to an embodiment of the present disclosure may include a housing body 111 forming the exterior, a suction port 115 through which external air is suctioned into the housing body 111, and a discharge port 116 through which air passing through the housing body 111 is discharged externally of the housing body 111.

Also, the discharge port 116 may be divided into a humidified air discharge port 118 through which air flowing in from the suction port 115 is discharged through the air purification filter 120 and the humidification member 160 described later, and a purified air discharge port 117 through which air is discharged without passing through the humidification member 160.

As illustrated in FIG. 1, the suction port 115 may be formed in the lower front portion of the housing 110, the humidified air discharge port 118 may be formed in the upper front portion of the housing 110, and the purified air discharge port 117 may be formed on the upper surface of the housing 110. However, the installation positions of the suction port 115 and the discharge port 116 (117, and 118) and the number of the suction port 115 and the discharge port 116, 117, and 118 may be varied. For example, the suction port 115 may be installed on a plurality of surfaces among the front, rear, left, and right surfaces of the housing 110 so as to suction air in various directions, and the installation positions of the humidified air discharge port 118 and the purified air discharge port 117 and the number of the humidified air discharge port 118 and the purified air discharge port 117 may also be varied.

Referring to FIG. 8, the air purification filter 120 may be provided within the housing 110 and may be configured to filter (purify) air flowing in from the suction port 115, and may be disposed on the rear end of the suction port 115. Also, the air purification filter 120 may be installed on the front end of the blowing part 170 such that air flowing in from the suction port 115 may be filtered by the air purification filter 120 and may flow into the blowing part 170.

The air purification filter 120 may be configured in a rectangular shape corresponding to the shape and cross-sectional area of the air flow path on the rear end of the suction port 115, and accordingly, the entire air flowing in through the suction port 115 of the housing 110 may pass through the air purification filter 120. However, the shape of the air purification filter 120 is not limited to the above-described rectangular shape, and various types of known filters may be used. For example, the air purification filter 120 may be configured as a three-dimensional filter having a circular or angular cross-sectional surface and having a space (hollow) formed therein.

Also, the air purification filter 120 may be selected from among filters having various shapes and functions, and the type of the air purification filter 120, the number of the air purification filter 120, the shape of the air purification filter 120 are not limited to the example illustrated in FIG. 8, and may be varied.

The water container 130 may include a water container body 131 for accommodating water for humidification therein, and a water supply valve member 135 opening and closing to allow water accommodated in the water container body 131 to be discharged.

The water container 130 may be configured to be separated from the air humidification and purification device 100 so as to easily fill the water container body 131 with water. For example, as illustrated in FIGS. 1 and 2, the water container body 131 of the water container 130 may be configured to form a portion of the exterior of the housing 110 and may be separated from the housing 110, but an example embodiment thereof is not limited thereto.

The water supply valve member 135 may be installed in a cap structure screwed to an inlet (an inlet port) of the water container body 131. The water supply valve member 135 may include an opening/closing part 136 elastically supported by an elastic means (a spring), and may have a mechanical valve structure in which a closed state is maintained while the opening/closing part 136 is not pressed, and an open state is maintained while the opening/closing part 136 is pressed. The water supply valve member 135 may be generally used for the water container 130 of a general humidifier, and thus, a detailed description thereof will not be provided.

Also, the water tank unit 140 may be installed within the housing 110 and may accommodate water supplied from the water container 130 by opening the water supply valve member 135.

Referring to FIGS. 3 and 4, the water tank unit 140 may include a water tank body 141 for accommodating water, and a water tank cover 145 for covering at least a portion of the upper portion of the water tank body 141. Also, an opening cover 143 for blocking the through-hole 112b (in FIG. 2) when the water tank unit 140 is mounted on the opening 113 of the housing 110 may be installed on the upper side of the water tank cover 145.

The water tank cover 145 may include a humidification member mounting opening 146 for mounting the humidification member 160, a water tank seating part 148 on which the water container 130 is seated, and an installation groove 147 in which the water supply regulating member 150 described later is installed.

As illustrated in FIG. 2, the water tank unit 140 may be installed to be separated from the housing 110 by sliding while the water container 130 is separated from the housing 110.

Also, the humidification member (humidification filter) 160 may perform humidification by vaporization (by blowing) using water supplied to the water tank body 141 of the water tank unit 140, and may be installed adjacent to the humidified air discharge port 118 and disposed side by side with the front of the housing 110

The humidification member 160 may be disposed on the rear end of the blowing part 170 on the air flow path, and accordingly, air flowing by operation of the blowing part 170 may be humidified while passing through the humidification member 160, and may be discharged through the humidified air discharge port 118.

As described above, since the air purification filter 120 is disposed on the front end of the blowing part 170 and the humidification member 160 is disposed on the rear end of the blowing part 170, when only an air purifying function is performed, the flowing of air filtered in the air purification filter 120 to the humidification member 160 may be limited, and accordingly, air purifying efficiency may increase. Also, even when the blowing fan provided in the blowing part 170 is driven even at a relatively low RPM and low power, a sufficient amount of discharge may be secured and noise may be reduced. Further, when humidification is performed in the blowing part 170 the flow path switching of the flow path regulating member 180 described later, as the entire discharged air flows toward the humidification member 160, the humidification efficiency may increase.

The humidification member 160 may be configured to have a material having excellent hygroscopicity or a shape so as to sufficiently absorb water contained in the water tank unit 140. As an example, the humidification member 160 may be configured to be immersed in water accommodated in the water tank body 141 as illustrated in FIGS. 2 to 4. However, the humidification member 160 is not limited to the above-described structure, and when humidification by vaporization is possible, various known vaporization-based humidification structures such as a rotating disk-shaped humidification member may be used.

As illustrated in FIGS. 3 and 4, the humidification member 160 may be mounted on and separated from the water tank unit 140 through the humidification member mounting opening 146 formed in the water tank cover 145. Also, the humidification member 160 may be separated from the housing 110 by sliding while the water container 130 is separated from the housing 110 and is mounted on the water tank unit 140.

Thereafter, the blowing part 170 may provide blowing force to allow air flowing in from the suction port 115 to flow to the discharge port 116 (117 and 118) via the air flow path part F1, F2, and F3 formed between the suction port 115 and the discharge port 116 (117 and 118).

Referring to FIG. 8, the air flow path part F1, F2, and F3 may include a blowing flow path F1 disposed on the discharge port side of the blowing part 170, a purification flow path F2 through which air from the blowing flow path F1 flows to the purified air discharge port 117, and a humidification flow path F3 which air from the blowing flow path F1 flows to the humidified air discharge port 118.

The specific air flow path of the air flow path part F1, F2, and F3 may be varied depending on the positions of the suction port 115 and the discharge port 116 (117 and 118), and the suction/discharge position and direction of the blowing part 170.

Also, the blowing part 170 may include a blowing fan for flowing air, and a fan motor for driving the blowing fan, similarly to a general blowing device used in an air purifier. In FIG. 8, the blowing part 170 may be disposed on the rear of the air purification filter 120 with respect to the air flow path and may have a structure in which air is suctioned from one side of the blowing part 170, but the installation position and the suctioning structure of the blowing part 170 is not limited to the examples illustrated in FIG. 8 and may be varied. For example, the blowing fan provided in the blowing part 170 may have a double suction structure in which air is suctioned from both sides of the blowing part.

The flow path regulating member 180 may be disposed to be able to rotate in the air flow path portion F1, F2, and F3, and may regulate the air flow to the discharge port 116 (117 and 118).

Referring to FIG. 8, the flow path regulating member 180 may switch the flow path such that air flowing through the air flow path part F1, F2, and F3 to pass through at least one of the humidified air discharge port 118 and the purified air discharge port 117.

Figure 10:
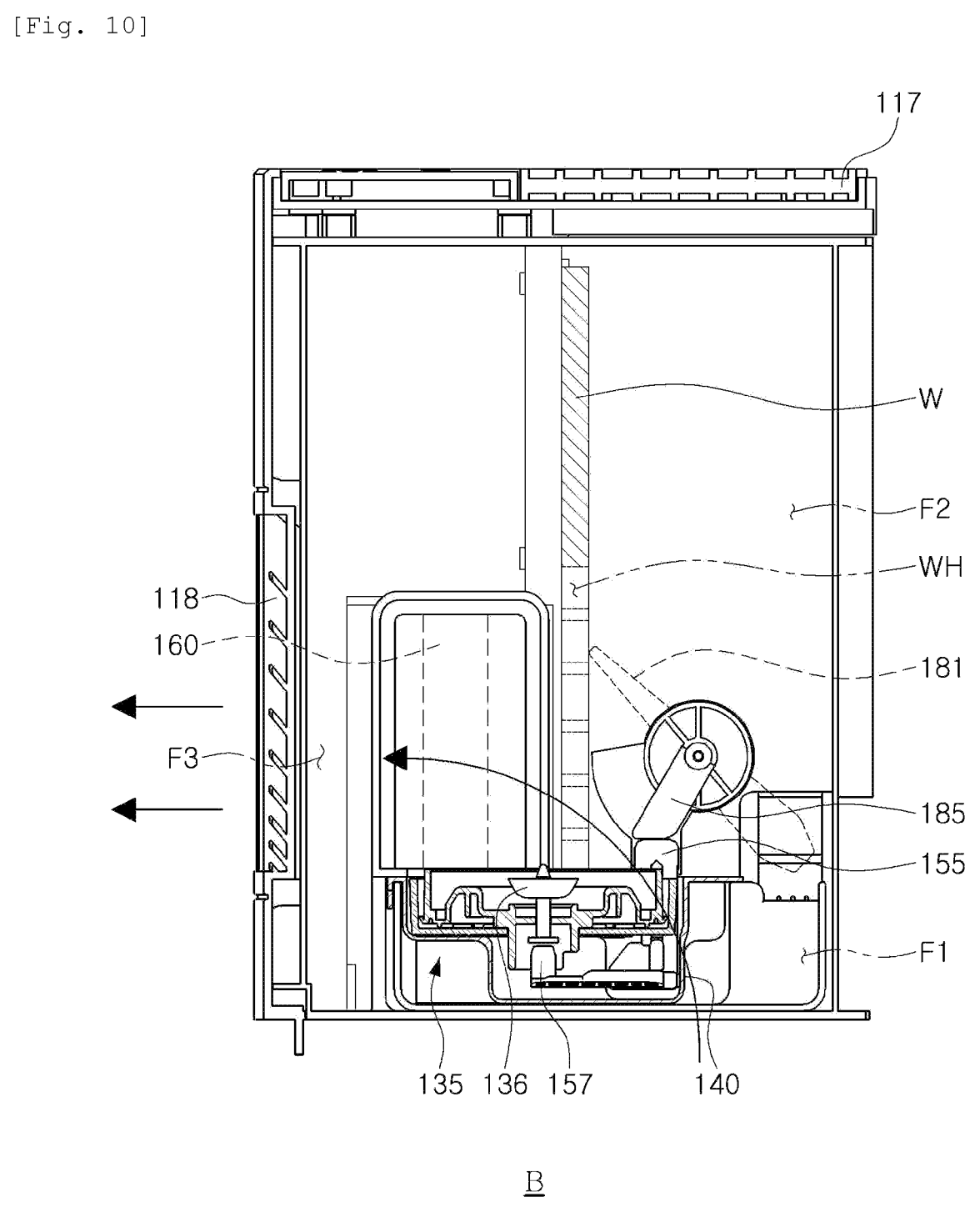

For example, the flow path regulating member 180 may be configured to rotate between the purification mode position (see FIG. 9) in which air filtered by the air purification filter 120 and discharged from the blowing part 170 may flow to the purified air discharge port 117 via the purification flow path F2, and a humidification mode position (see FIG. 10) in which air from the blowing part 170 may flow to the humidified air discharge port 118 via the humidification flow path F3. That is, air purified through the air purification filter 120 may pass through the humidification member 160 and may be discharged through the humidified air discharge port 118 in a humidified state when the flow path regulating member 180 is in the humidification mode position illustrated in FIG. 10, and when the flow path regulating member 180 is in the purification mode position illustrated in FIG. 9, air may be discharged through the purified air discharge port 117 without passing through the humidification member 160.

The flow path regulating member 180 may be disposed in a third position (a drying mode position) disposed between the purification mode position and the humidification mode position (see FIG. 11), and in the case, air from the blowing part 170 may be branched into the purification flow path F2 and the humidification flow path F3 and may flow to both the purified air discharge port 117 and the humidified air discharge port 118.

Referring to FIGS. 6 and 8, the flow path regulating member 180 may include a body part 181 configured to cross the air flow path part F1, F2, and F3 to open and close at least a portion of the air flow path part F1, F2, and F3, and a pressing part 185 configured to pressurize the water supply regulating member 150 described later as the body part 181 rotates around the rotary shaft part 183.

Also, the flow path regulating member 180 may be configured to rotate by a driving part M including a motor and other components. Accordingly, by controlling the driving part M by the control part C, the flow path regulating member 180 may rotate between the purification mode position and the humidification mode position.

The opening and closing of the water supply valve member 135 provided in the water container 130 may be configured to be performed by rotation of the flow path regulating member 180.

For example, when humidification is performed through the humidification member 160, that is, when the flow path regulating member 180 is in the humidification mode position, the flow path regulating member 180 may be configured to open the water supply valve member 135 provided in the water container 130 such that water may be supplied from the water container 130 to the water tank unit 140.

As such, according to an embodiment of the present disclosure, since the opening and closing of the water supply valve member 135 provided in the water container 130 is performed by rotation of the flow path regulating member 180, the water supply from the water container 130 to the water tank unit 140 may be efficiently blocked, and a driving means for supplying water to the water tank unit 140 may not be necessary.

The air humidification and purification device 100 according to an embodiment of the present disclosure may further include a water supply regulating member 150 installed in the water tank unit 140 and operating to open and close the water supply valve member 135 provided in the water container 130

In the case, the flow path regulating member 180 may be configured to pressurize the water supply regulating member 150 to open the water supply valve member 135 provided in the water container 130.

The water supply regulating member 150 may be installed in the water tank cover 145 of the water tank unit 140 as illustrated in FIGS. 3 and 4.

Referring to FIGS. 3 to 5 and 7, the water supply regulating member 150 may include a body part 151, a contact part 155 disposed on one side of the body part 151 and able to be pressed by the pressing part 185 of the flow path regulating member 180, a pushing part 157 formed on the other side of the body part 151 and able to pressurize the water supply valve member 135 of the water container 130, and a rotary shaft part 153 disposed between the contact part 155 and the pushing part 157 and coupled to the installation groove 147 formed in the water tank cover 145.

Accordingly, the water supply regulating member 150 may be configured to be perform seesaw movement with respect to the rotary shaft part 153 (see the arrow in FIG. 3). Also, referring to FIGS. 3, 5, 8 and 10, when the pressing part 185 of the flow path regulating member 180 pressurizes the contact part 155 downwardly, the pushing part 157 may move upwardly with respect to the rotary shaft part 153, such that the water supply valve member 135 may be opened. That is, as illustrated in FIG. 10, when the pushing part 157 moves upwardly, the opening/closing part 136 provided in the water supply valve member 135 may move upwardly, such that the space into which water may flow may be formed around the opening/closing part 136, and accordingly, water may be supplied from the water container 130 to the water tank unit 140.

Referring to FIGS. 3 and 4, the installation groove 147 of the water tank cover 145 in which the water supply regulating member 150 is installed may be configured as a groove in which, while the water supply regulating member 150 is installed in the water tank cover 145, the contact part 155 side (upper side) may be opened and the pushing part 157 side (lower side) may be closed. Accordingly, the water supply regulating member 150 may maintain a stable position without being separated from the installation groove 147 even when the pressing part 185 of the flow path regulating member 180 pressurizes the contact part 155 of the water supply regulating member 150.

Referring to FIGS. 2 and 5, the housing 110 may include an opening 113 in which the water container 130 is installed, and a partition 112 for partitioning the air flow path part F1, F2, and F3.

In the case, the water supply regulating member 150 may be disposed in the opening 113 which may be the outer side of the partition 112, and the flow regulating member 180 may be disposed in the air flow path part F1, F2, and F3 which may be the inner side of the partition 112. However, the pressing part 185 of the flow path regulating member 180 may be exposed to the opening 113 through the through-hole 112a formed in the partition 112 to pressurize the contact part 155 of the water supply regulating member 150 disposed in the opening 113.

Also, since the humidification member 160 is also disposed in the humidification flow path F3 of the air flow path part F1, F2, and F3 which may be the inner side of the partition 112, another through-hole 112b may be formed in the partition 112 to allow the water tank unit 140 on which the humidification member 160 is mounted may be disposed in the humidification path F3, and an opening cover 143 may be provided on the water tank unit 140 to close the through-hole 112b.

Referring to FIGS. 3 and 7, when the water tank unit 140 is installed in the housing 110, when the contact part 155 of the water supply regulating member 150 is lifted upwardly, the contact part 155 may be in contact with and may interfere with the side surface of the pressing part 185 of the flow path regulating member 180. In the case, the water tank unit 140 may not be properly installed, such that water may not be supplied from the water container 130, which may be problematic.

To address the above problem, in the air humidification and purification device 100 according to an embodiment of the present disclosure, the contact part 155 side may be inclined in a downward direction with respect to the rotary shaft part 153 while the water supply regulating member 150 is installed on the water tank cover 145. To the end, the water supply regulating member 150 may be configured to include a weight part 159 for adding weight to one side of the body part 151, that is, the contact part 155 side. Accordingly, when the water tank unit 140 is separated from the housing 110, the contact part 155 may be inclined downwardly by the weight of the weight part 159. Therefore, even when the water tank unit 140 is mounted on the housing 110, the contact part 155 of the water supply regulating member 150 may not be interfered with the pressing part 185 of the flow path regulating member 180, such that the water tank unit 140 may be stably installed.

The air humidification and purification device 100 according to an embodiment of the present disclosure may further include a control part C (in FIG. 6) for controlling operation of the flow path regulating member 180 and the blowing part 170. The control part C may regulate the rotational position of the flow path regulating member 180 in response to the purification mode and the humidification mode and may drive the blowing part 170. Also, the controller C may move the flow path regulating member 180 to the drying mode position (the third position) disposed between the humidification mode position and the purification mode position, such that the humidification member 160 is dried after the humidification ends. In this state, the blowing part 170 may be driven to dry water absorbed in the humidification member 160 and/or water contained in the water tank unit 140.

The drying mode may be performed for a predetermined period of time required for drying the humidification member 160 and/or the water tank unit 140 through time control, but an example embodiment thereof is not limited thereto.

Next, the operations in the purification mode, the humidification mode and the drying mode will be described with reference to FIGS. 9 to 11.

As illustrated in FIG. 9, in the purification mode, the flow path regulating member 180 may be disposed in the vertical direction to open the purification flow path F2 of the air flow path part F1, F2, and F3. As such, when the body part 181 of the flow path regulating member 180 is installed in parallel to the purification flow path F2, the air blown from the blowing part 170 may be discharged through the purified air discharge port 117 via the open purification flow path F2 due to flow resistance of the humidification member 160 installed in the humidification flow path F3.

In the case, the pressing part 185 of the flow path regulating member 180 may be spaced apart from the contact part 155 of the water supply regulating member 150, such that the pushing part 157 of the flow path regulating member 180 may not pressurize the water supply valve member 135. Accordingly, the opening/closing part 136 provided in the water supply valve member 135 may maintain a closed state by the elastic force of the elastic means (the spring), and water may not be supplied from the water container 130 to the water tank unit 140.

Thereafter, as illustrated in FIG. 10, in the humidification mode, the flow path regulating member 180 may be disposed in a direction of crossing the transverse cross-sectional surface of the purification flow path F2, such as, for example, in an oblique direction, to close the purification flow path F2 of the air flow path part F1, F2, and F3. That is, the flow path regulating member 180 may be disposed such that the upper end of the body part 181 may be inclined toward the humidified air discharge port 118. In the case, the upper end of the body part 181 of the flow path regulating member 180 may be adjacent to a partition wall W and the lower end may be adjacent to the opposite side of the partition wall W, such that the air flow to the purification flow path F2 may be blocked and air flowing through the air flow path part may flow into the humidification path F3 through the through-hole WH formed in the partition wall W. Accordingly, the air blown from the blowing part 170 may be humidified through the humidification member 160 and discharged externally of the housing 110 through the humidified air discharge port 118.

In the case, since the pressing part 185 of the flow path regulating member 180 may be in contact with the contact part 155 of the water supply regulating member 150 and may pressurize the contact part 155, the contact part 155 of the water supply regulating member 150 may move in a downward direction with respect to the rotary shaft part 153, and the pushing part 157 of the water supply regulating member 150 may move in the upward direction with respect to the rotary shaft part 153. Accordingly, the pushing part 157 of the flow path regulating member 180 may pressurize the opening/closing part 136 of the water supply valve member 135 upwardly, such that the opening/closing part 136 may move upwardly. Accordingly, the opening/closing part 136 may be opened, such that water may be supplied from the water container 130 to the water tank unit 140.

Meanwhile, as illustrated in FIG. 11, the flow path regulating member 180 may have the third position (the drying mode position) disposed between the purification mode position and the humidification mode position. When the flow path regulating member 180 is disposed in the third position, the humidification member 160 and/or the water tank unit 140 may be dried.

Specifically, as illustrated in FIG. 11, the inclination angle of the flow path regulating member 180 in the vertical direction may be smaller than the inclination angle in the vertical direction in the humidification mode position in FIG. 10. In the case, the upper end of the flow path regulating member 180 may be slightly spaced apart from the partition wall W and the lower end may be slightly spaced apart from the opposite wall of the partition wall W, such that some air may flow into the purification flow path F2 and some air may flow into the humidification path F3 through the through-hole WH formed in the partition wall W. As such, as some air passes through the humidification member 160, the humidification member 160 may be dried. Also, the humidification member 160 may be configured to absorb moisture of the water contained in the water tank unit 140, and in the case, water contained in the water tank unit 140 may be dried according to the drying of the humidification member 160.

Also, when the flow path regulating member 180 rotates from the humidification mode position to the third position, the contact between the pressing part 185 of the flow path regulating member 180 and the contact part 155 of the water supply regulating member 150 may be released Accordingly, the opening/closing part 136 provided in the water supply valve member 135 may be closed by the elastic force of the elastic means (spring), and the water supply from the water container 130 to the water tank unit 140 may be blocked.

In the case, to increase drying efficiency, the position of the flow path regulating member 180 in the drying mode may be determined to sufficiently secure the amount of air blown into the humidification flow path F3. For example, the position of the flow path regulating member 180 in the drying mode may slightly rotate from the humidification mode position such that the contact between the pressing part 185 and the contact part 155 of the water supply regulating member 150 may be released and the opening/closing part 136 may be closed.

To perform the drying mode, the controller C may move the flow path regulating member 180 from the humidification mode position to the drying mode position between the humidification mode position and the purification mode position after the humidification mode ends, such that the humidification member 160 may be dried. In this state, the blowing part 170 may be driven to dry the water absorbed in the humidification member 160 and/or the water contained in the water tank unit 140.

However, the drying mode may be performed not only after the humidification mode ends, and the drying mode may be performed by a user selection or may be performed after the purification mode ends.

The drying mode may be performed for a predetermined period of time necessary for drying the humidification member 160 and/or the water tank unit 140 through time control, but an example embodiment thereof is not limited thereto.

As such, according to an embodiment of the present disclosure, the humidification mode in which water is supplied by a simple manipulation of rotating the flow path regulating member 180 and the purification mode in which humidification is not performed may be easily implemented, and the drying mode for drying the humidification member 160 may also be easily performed.

Also, according to an embodiment of the present disclosure, water may be supplied to the water tank unit 140 only when the flow path regulating member 180 is in the humidification mode position, and water supply to the water tank unit 140 may be blocked in the purification mode and the drying mode position, such that, by performing the drying mode, moisture present in the water tank unit 140 and/or the humidification member 160 may be removed. Accordingly, contamination and bacterial generation in the water tank unit 140 and/or the humidification member 160 may be significantly reduced.

While the embodiments have been illustrated and described above, it will be apparent to those skilled in the art that modifications and variations could be made without departing from the scope in the embodiment as defined by the appended claims.

DESCRIPTION OF REFERENCE NUMERAL

100 . . . AIR HUMIDIFICATION AND PURIFICATION DEVICE 110 . . . HOUSING

111 ... HOUSING BODY
112 ... PARTITION 112A, 112B ... THROUGH-HOLE
113 ... OPENING
115 ... SUCTION PORT 116 ... DISCHARGE PORT 117 ... PURIFIED AIR DISCHARGE PORT
118 ... HUMIDIFIED AIR DISCHARGE PORT 120 ... AIR PURIFICATION FILTER
130 ... WATER CONTAINER
131 ... WATER CONTAINER BODY 135 ... WATER SUPPLY VALVE MEMBER 136 ... OPENING/CLOSING PART
140 ... WATER TANK UNIT 141 ... WATER TANK BODY 143 ... OPENING COVER
145 ... WATER TANK COVER 146 ... HUMIDIFICATION MEMBER MOUNTING OPENING
147 ... INSTALLATION GROOVE
148 ... WATER TANK SEATING PART 150 ... WATER SUPPLY REGULATING MEMBER
151 ... BODY PART
153 ... ROTARY SHAFT PART 155 ... CONTACT PART
157 ... PUSHING PART
159 ... WEIGHT PART 160 ... HUMIDIFICATION MEMBER 170 ... BLOWING PART
180 ... FLOW PATH REGULATING MEMBER 181 ... BODY PART 183 ... ROTARY SHAFT PART
185 ... PRESSING PART C ... CONTROL PART F1 ... BLOWING FLOW PATH
F2 ... PURIFICATION FLOW PATH F3 ... HUMIDIFICATION FLOW PATH M ... DRIVING PART
W ... PARTITION WALL WH ... THROUGH-HOLE

The invention claimed is:
1. An air humidification and purification device, comprising:
   a housing having a suction port through which air is suctioned, and a discharge port through which air is discharged;
   a blowing part provided in the housing, the blowing part including a blowing fan for providing blowing force to allow air flowing in from the suction port to flow to the discharge port;
   an air purification filter disposed in the housing and filtering air flowing in from the suction port;
   a water container provided in the housing and having a water supply valve member opening and closing to allow water contained therein to be discharged;
   a water tank unit for receiving water from the water container;
   a water supply regulating member installed in the water tank unit and operating to open and close the water supply valve member of the water container, the water supply regulating member including a contact part and a pushing part disposed at two opposite sides thereof;
   a humidification member mounted on the water tank unit and immersed in water for performing humidification using water supplied to the water tank unit;
   an air flow path part including a space formed between the suction port and the discharge port and in which air flowing from the suction port flows;
   a flow path regulating member rotatably disposed in the space of the air flow path part; and
   a driving part including a motor for providing rotational force to the flow path regulating member,
   wherein the flow path regulating member further includes:
      a rotary shaft part formed as a center of rotation;
      a body part rotating integrally with the rotary shaft part and configured to cross the air flow path part to open and close at least a portion of the air flow path part; and
      a pressing part configured to rotate integrally with the rotary shaft part such that upon the rotation of the pressing part toward the water tank unit, a rotated end of the pressing part contacts and presses down the contact part of the water supply regulation member which in turn causes the pushing part of the water supply regulation member to provide pressing force to open the water supply valve member, and
   wherein, when the flow path regulating member rotates, a direction of air flow in the air flow path part is changed by the body part, and the water supply valve member opens and closes by the pressing part.

2. The air humidification and purification device of claim 1, wherein the discharge port includes a humidified air discharge port through which air flowing in from the suction port is discharged through the air purification filter and the humidification member, and a purified air discharge port through which air is discharged without passing through the humidification member.

3. The air humidification and purification device of claim 2, wherein the flow path regulating member switches a flow path such that air flowing through the air flow path part is discharged through at least one of the humidified air discharge port and the purified air discharge port.

4. The air humidification and purification device of claim 3, wherein the flow path regulating member has a purification mode position in which air flowing through the air flow path part is discharged through the purified air discharge port, and a humidification mode position in which air is discharged through the humidified air discharge port.

5. The air humidification and purification device of claim 4, wherein the flow path regulating member is configured to open the water supply valve member in the humidification mode position.

6. The air humidification and purification device of claim 4, wherein the flow path regulating member further includes a third position disposed between the purification mode position and the humidification mode position such that air flowing through the air flow path part is discharged through the purified air discharge port and the humidified air discharge port.

7. The air humidification and purification device of claim 6, wherein a rotational position of the flow path regulating member is changed to the third position and the blowing part operates to dry water absorbed in the humidification member such that the humidification member is dried after the humidification is ended.

8. The air humidification and purification device of claim 1, wherein the flow path regulating member opens the water supply valve member by pressurizing the contact part and the pushing part of the water supply regulating member.

9. The air humidification and purification device of claim 8, wherein the water tank unit includes a water tank body for accommodating water therein, and a water tank cover for covering at least a portion of an upper portion of the water tank body, and
   wherein the water supply regulating member is installed on the water tank cover.

10. The air humidification and purification device of claim 9, wherein the water supply regulating member further includes:
  another body part;
  the contact part formed on one side of the body part and pressed by the flow path regulating member;
  the pushing part formed on the other side of the body part and pressurizing the water supply valve member; and
  another rotary shaft part disposed between the contact part and the pushing part and coupled to an installation groove formed in the water tank cover.

11. The air humidification and purification device of claim 10, wherein the water supply regulating member is configured to be able to perform seesaw movement with respect to the rotary shaft part, and
  wherein, when the flow path regulating member pressurizes the contact part downwardly, the pushing part moves upwardly and opens the water supply valve member.

12. The air humidification and purification device of claim 10, wherein the water supply regulating member includes a weight part for adding weight to one side of the body part such that a side of the contact part is inclined downwardly with respect to the rotary shaft part in a state in which the water supply regulating member is installed in the water tank cover.

13. The air humidification and purification device of claim 10, wherein the installation groove is configured as a groove in which a side of the contact part is opened and a side of the pressing part is closed in a state in which the water supply regulating member is installed on the water tank cover.

14. The air humidification and purification device of claim 13, wherein
  the housing includes an opening in which the water container is installed and a partition for dividing the air flow path part therein,
  wherein the water supply regulating member is disposed in the opening, and wherein the pressing part of the flow path regulating member is exposed to the opening through a through-hole formed in the partition so as to pressurize the contact part.

15. The air humidification and purification device of claim 1, wherein the water tank unit and the humidification member are installed to be separated from the housing by sliding while the water container is separated from the housing.

16. The air humidification and purification device of claim 1, wherein the humidification member is disposed on a rear end of the blowing part and is configured to humidify air discharged from the blowing part.

17. The air humidification and purification device of claim 16,
  wherein the suction port is formed in a front lower portion of the housing, wherein a humidified air discharge port is formed on a front upper portion of the housing,
  wherein a purified air discharge port is formed on an upper surface of the housing, and
  wherein the humidification member is installed side by side with a front surface of the housing.

18. The air humidification and purification device of claim 17, wherein the flow path regulating member is disposed in a vertical direction when air is discharged through the purified air discharge port, and an upper end thereof is inclined toward the humidified air discharge port when air is discharged through the humidified air discharge port.

19. The air humidification and purification device of claim 17,
  wherein the flow path regulating member is able to be disposed in a third position disposed between a purification mode position and a humidification mode position, and
  wherein the water supply valve member has a closed state in the purification mode position and the third position.

* * * * *